US012099831B2

United States Patent
Parsons et al.

(10) Patent No.: US 12,099,831 B2
(45) Date of Patent: Sep. 24, 2024

(54) APPARATUS AND METHOD FOR AUTOMATICALLY REMOVING DATA OF MOBILE DEVICES

(71) Applicant: Communications Test Design, Inc., West Chester, PA (US)

(72) Inventors: Sean Parsons, West Chester, PA (US); Brian Parsons, Malvern, PA (US); Mark Parsons, West Chester, PA (US); Austin Gunter, Flower Mound, TX (US); Nidhin Davis, Avondale, PA (US); Krissy Durkin, Colora, MD (US); Mario Huber, Kuppenheim (DE); Martin Fiedler, Karlsruhe (DE); Annedore Bach, Durmersheim (DE); Jitendra Jain, Exton, PA (US)

(73) Assignee: Communications Test Design, Inc., West Chester, PA (US)

( * ) Notice: Subject to any disclaimer, the term of this patent is extended or adjusted under 35 U.S.C. 154(b) by 841 days.

(21) Appl. No.: 17/007,103

(22) Filed: Aug. 31, 2020

(65) Prior Publication Data

US 2021/0067957 A1 Mar. 4, 2021

Related U.S. Application Data

(60) Provisional application No. 62/893,427, filed on Aug. 29, 2019.

(51) Int. Cl.
*G06F 13/10* (2006.01)
*G06F 8/654* (2018.01)
(Continued)

(52) U.S. Cl.
CPC .............. *G06F 8/654* (2018.02); *G06F 13/10* (2013.01); *G06F 16/162* (2019.01);
(Continued)

(58) Field of Classification Search
None
See application file for complete search history.

(56) References Cited

U.S. PATENT DOCUMENTS 9,189,378 B1 * 11/2015 Ryan .................... G06F 11/3668
2013/0198144 A1 * 8/2013 Bowles .............. G06Q 30/0278
707/668

(Continued)

FOREIGN PATENT DOCUMENTS

CA 2796615 A1 * 5/2013 ............. G06F 21/57

OTHER PUBLICATIONS

Lee et al. "Secure Data Deletion for USB Flash Memory." 2011. Jounal of Information Science and Engineering. vol. 27. pp. 933-952.*

(Continued)

*Primary Examiner* — Nathan Sadler
(74) *Attorney, Agent, or Firm* — Duane Morris LLP (57) ABSTRACT

Apparatus and methods for automatically removing customer data of a mobile device are disclosed according to various embodiments. In one example, a disclosed method comprises: detecting a mobile device connected to a slot; automatically determining whether the mobile device is valid based on data in a file system; upon determining that the mobile device is valid, automatically determining an operating system managing the mobile device; and automatically removing customer data of the mobile device based on the operating system.

20 Claims, 5 Drawing Sheets

(51) Int. Cl.
    *G06F 16/16*     (2019.01)
    *G06F 21/60*     (2013.01)
    *G06F 21/62*     (2013.01)

(52) U.S. Cl.
    CPC ........ *G06F 21/604* (2013.01); *G06F 21/6218* (2013.01); *G06F 2221/2143* (2013.01)

(56) References Cited

U.S. PATENT DOCUMENTS

| | | | | |
|---|---|---|---|---|
| 2014/0187172 A1* | 7/2014 | Partee | ................... | H04H 20/12 455/67.12 |
| 2014/0278244 A1* | 9/2014 | Humphrey | ............. | G01N 21/01 702/182 |
| 2016/0171456 A1* | 6/2016 | Bowles | ................... | G07F 7/06 705/23 |
| 2016/0255495 A1* | 9/2016 | Huang | ................... | H04W 8/22 455/550.1 |
| 2017/0279945 A1* | 9/2017 | Parsons | ................. | A47B 87/00 |
| 2019/0335033 A1* | 10/2019 | Huang | ................. | G06Q 10/30 |
| 2019/0354298 A1* | 11/2019 | Öberg | ................... | G06F 3/0652 |
| 2021/0081351 A1* | 3/2021 | Villareal | .......... | H04M 1/72409 |
| 2022/0164772 A1* | 5/2022 | Fabritius | ................ | G06Q 10/10 |

OTHER PUBLICATIONS

Pixplicity. "Debugging Android devices on Linux." Sep. 2015. https://medium.com/@pixplicity/debugging-android-devices-on-linux-9f4d74d1bee4.*

Roger Ye. Android System Programming. May 2017. Packt Publishing.*

"/private/var/mobile/Library/Preferences/com.apple.purplebuddy.plist." Apr. 2017. https://www.theiphonewiki.com/wiki//private/var/mobile/Library/Preferences/com.apple.purplebuddy.plist.*

* cited by examiner

APPARATUS AND METHOD FOR AUTOMATICALLY REMOVING DATA OF MOBILE DEVICES

CROSS-REFERENCE TO RELATED APPLICATION

This application claims priority to U.S. Provisional Application No. 62/893,427 filed on Aug. 29, 2019, the entirety of which is hereby incorporated by reference herein.

TECHNICAL FIELD

The present disclosure generally relates to apparatus and methods for data removal, and more specifically, to apparatus and methods for automatically removing customer data of mobile devices.

BACKGROUND

Mobile devices, including tablets and phones, have become sophisticated, widespread and pervasive. With the increasing usage of computer network services all over the world, these mobile devices are in great demand. As a result, the cost of used mobile devices has increased. As with any used device, the customer data of the used mobile device needs to be cleaned before resale. As the number of used mobile devices increases, and the data on the used mobile devices increases, removing customer data of various mobile devices is not only complicated, but also time consuming and expensive.

SUMMARY

The present disclosure generally relates to systems and methods for testing mobile devices. More specifically, some embodiments of the present disclosure are directed to apparatus and methods for automatically removing customer data of one or more mobile devices.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method is disclosed for automatically removing customer data of a mobile device. The method includes: detecting a mobile device connected to a slot; automatically determining whether the mobile device is valid based on data in a file system; upon determining that the mobile device is valid, automatically determining an operating system managing the mobile device; and automatically removing customer data of the mobile device based on the operating system.

In another embodiment, a method is disclosed for automatic data removal. The method includes: scanning, using a scanner, a first slot number of a first slot on a rack including a plurality of slots; scanning, using the scanner, a first serial number attached on a first mobile device; associating the first serial number with the first slot number; plugging a first connector associated with the first slot into the first mobile device; loading the first mobile device onto the first slot; and automatically performing a removal of customer data of the first mobile device via the first connector and a first computer associated with the first slot.

In yet another embodiment, an apparatus is disclosed for automatic data removal. The apparatus includes: a rack comprising a plurality of slots each of which is configured for holding a mobile device; a plurality of connectors each of which is associated with a respective one of the plurality of slots; at least one computer coupled to the rack, wherein each of the at least one computer corresponds to a subset of the plurality of connectors, and has a processor and a non-transitory computer readable storage medium storing software for automatically removing customer data of each mobile device connected to the computer via a corresponding one of the subset of the plurality of connectors; and a user monitor electrically connected to the at least one computer and configured for displaying information related to data removal performed by the at least one computer.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "vertically," "downwardly," "upwardly," etc.) should be construed to refer to the orientation as then described or as shown in the drawing under discussion. These relative terms are for convenience of description and do not require that the apparatus be constructed or operated in a particular orientation.

An object of the present disclosure, among others, is to provide an apparatus and method to automatically remove data of one or more mobile devices (data of multiple devices can be removed simultaneously either together or independently). In one embodiment, a system is provided for performing data removal of mobile devices, e.g. tablets, smartphones, smart watches. The system comprises software that interacts with and controls mobile devices in order to clear the customer data. The software may be custom-configurable to accommodate for different hardware setups.

The disclosed system may support data removal of mobile devices that are running on any operating system, e.g. iOS or Android®. For an iOS device, the data removal is performed by pairing the device with a computer to establish a two-way communication. Then, the computer can use various services present on the iOS device to obtain device information and clear data on the device. For an Android® device, the data removal is performed using an application that is installed onto the device.

Figure 1:
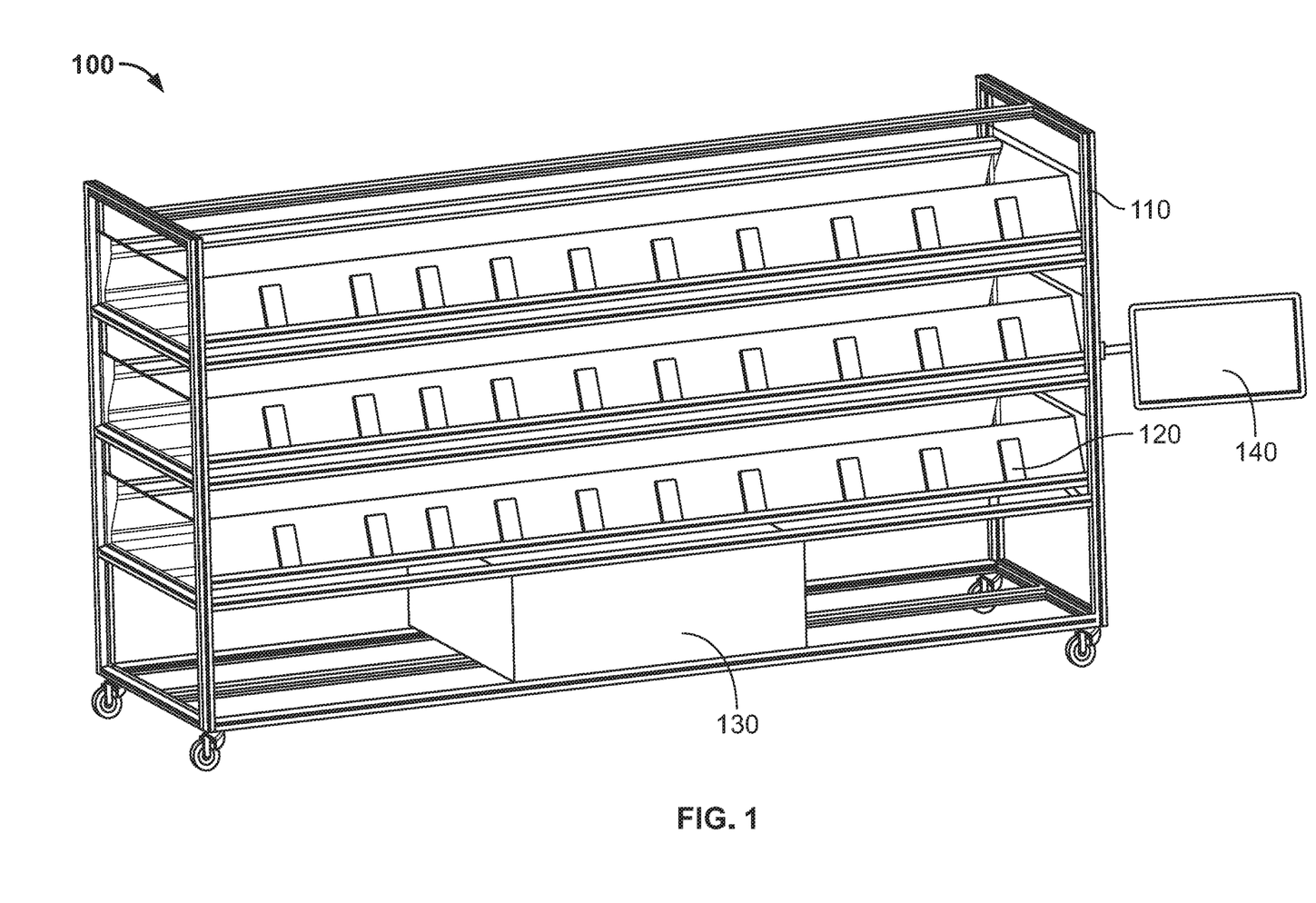
FIG. 1 is a perspective view of a mobile device handling apparatus, in accordance with some embodiments of the present disclosure.

In one embodiment, the disclosed system includes a double-sided 30-slot apparatus. An illustrative embodiment of a mobile device handling apparatus 100 is shown in FIG. 1. The methods in the present disclosure can be applied for not only removing data of mobile devices, but also other electronic devices. The mobile device handling apparatus 100, as shown in FIG. 1, comprises a retention rack 110, a controlling device 130, and a user monitor 140. The retention rack 110 in this example is a double-sided rack that houses computers, e.g. personal computers (PCs), and Universal Serial Bus (USB) hubs (not shown in FIG. 1).

As shown in FIG. 1, the retention rack 110 provides 30 slots 120 on each side. Each slot here is a location where a mobile device can be positioned. A mobile device for data removal may be placed and/or fixed at a slot. In one embodiment, each slot has an associated connector that has multiple types of interfaces, e.g. USB, USB Mini, USB Type-C, Lightning, etc. Each slot is configured for holding a mobile device that is connected to the connector associated with the slot. Based on the type of the mobile device, the user may connect the mobile device via a corresponding interface of the connector.

In one embodiment, each side of the retention rack 110 acts as an independent system. In the example shown in FIG. 1, the double-sided retention rack 110 comprises two identical sides that act as independent test stations.

In the example shown in FIG. 1, the mobile device handling apparatus 100 comprises at least one computer coupled to the retention rack 110. Each of the at least one computer may correspond to a subset of the plurality of connectors and thus correspond to a subset of the slots on the retention rack 110. Each computer may have a processor and a non-transitory computer readable storage medium storing software for automatically removing customer data of each mobile device connected to the computer via a corresponding connector.

In one embodiment, the controlling device 130 comprises two test computers. Each test computer is associated with 30 ports or slots on one side of the double-sided retention rack 110, and runs an application as well as a 30-slot graphic user interface (GUI) for interaction with users. In one embodiment, each test computer is a PC that acts independently as an independent data removal or testing system. In one embodiment, each test PC may run on a Linux operating system.

In one embodiment, each test computer comprises test software and drives the test functionality through the test application. The test software communicates with the test application and triggers various test activities to perform specific tasks as required by each test. One test activity is to erase or remove customer data of a mobile device. The customer data removal may be performed independent of other testing activities related to the mobile device, e.g. before or after the other testing activities.

According to various embodiments, different data removal algorithms may be used under different conditions, based on different serial numbers of the mobile devices, and for different operating systems running on different mobile devices. A data removal algorithm on the computer can determine what operations will be performed to remove the customer data of a mobile device. For example, based on the algorithm, automatically performing the removal of the customer data may comprise at least one of: removing all data of the mobile device without backup; performing a backup of critical data of the mobile device before the removal; performing a backup of image data of the mobile device before the removal; performing a backup of all data of the mobile device before the removal; or performing an update of software of the mobile device. The algorithm is customizable based on the customer needs. A default algorithm may also be pre-determined for a user without requesting customization.

In one embodiment, the computer can automatically perform the removal of the customer data after the mobile device is connected to the computer, regardless of a current status of the mobile device and regardless of a current screen of the mobile device. For example, whether the mobile device has a lock screen or a screen showing a running app, the computer can automatically perform the removal of the customer data based on the algorithm, once the mobile device is connected to the computer via a corresponding connector on a slot.

The entire data removal process may take several seconds to 20 minutes, depending on the setup of the algorithm and the data amount on the mobile device. For example, it may take a few seconds to just delete all customer data of the mobile device; it may take 2 to 3 minutes to perform a backup of critical data on the mobile device; it may take 8 to 10 minutes to perform a backup of image data on the mobile device; and it may take 15 to 20 minutes to perform a backup of image data on the mobile device and perform a software update of the mobile device.

In one embodiment, each side of the retention rack 110 can utilize up to 30 USB connections via 30 USB ports. Each USB port on the retention rack 110 may correspond to a slot that is labeled with a slot number such that a user can easily keep track of which USB port corresponds to which slot.

The mobile device handling apparatus 100 may comprise a plurality of cable hubs each of which is configured for connecting a subset of the plurality of connectors to one of the at least one computer. In one embodiment, the mobile device handling apparatus 100 comprises four 16-slot USB hubs. Each side of the retention rack 110 uses two USB hubs, which allows for a maximum of 32 possible USB ports per side. In this example, 30 of these 32 ports are used to connect to the testing system for data removal or testing.

Each slot of the double-sided retention rack 110 is connected to a corresponding test computer through a corresponding USB hub. Once a mobile device is connected to a slot, it can be detected by the corresponding test computer, which allows data transfer between the corresponding test computer and the connected mobile device.

In one embodiment, the mobile device handling apparatus 100 further comprises a scanner electrically connected to the at least one computer. For each of the plurality of slots, the scanner is configured for: scanning a slot number of the slot; scanning a serial number of a corresponding mobile device to be held on the slot; and associating the scanned serial number with the scanned slot number, before removing customer data of the corresponding mobile device.

After the scanned serial number is associated with the scanned slot number, the test computer may automatically start removing customer data of the mobile device. In one embodiment, the mobile device handling apparatus 100 further comprises a user monitor 140 electrically connected to the at least one computer and configured for displaying information related to data removal performed by the at least one computer.

The user monitor 140 may be connected to the test computers in the controlling device 130 for monitoring operation of the test computers. For example, in the example shown in FIG. 1, where there are 30 slots in a system, the user monitor 140 may show the status of each of the 30 slots, in 30 split screen views or in 30 different rows or columns, respectively. In one embodiment, there are two user monitors 140 each of which is a touchscreen monitor mounted onto a corresponding side of the retention rack 110 to allow users to interact with the GUI of the test computers. After removing the customer data of each mobile device, a visual indication may be shown on the mobile device to indicate a finish of the customer data removal of the mobile device. A small printer (not shown in FIG. 1) may also be mounted onto each side of the retention rack 110 for printing labels once the data erasure process is complete.

After a mobile device is connected to a connector and placed on a corresponding slot and while the customer data is being removed from the mobile device, the user may connect another mobile device to another connector on another slot for data removal. The data removal of the first mobile device may be done after the N-th mobile device is loaded for data removal, where N may be an integer larger than 1.

The number of slots 120 on each side, the number of test computers, the number of user monitors 140, and correspondingly the number of mobile devices that can be simultaneously handled for data removal and/or testing, may vary based on different embodiments or different application scenarios. The double-sided retention rack 110 may be constructed out of any material that provides sufficient rigidity for the mobile device handling apparatus 100, including metals, plastics, or other materials that are known to those with ordinary skill in the art.

In another embodiment, the test system is a 10-slot test system. The 10-slot test system includes a test computer that is associated with 10 ports of the test system and runs an application as well as a 10-slot GUI for interaction with users. Correspondingly, the 10-slot test system includes a 10-slot USB hub for connecting up to 10 devices to the test computer for data removal and/or testing.

In one embodiment, the testing system runs both a main application and a GUI application on a test computer for data removal of mobile devices. The main application handles all of the communications between the test computer and the connected mobile devices. The application can communicate device information such as international mobile equipment identity (IMEI), model, serial number, etc. It also controls all aspects of the data erasure process, e.g. a current erasure status.

A data removal or erasure process may be started from the GUI whenever the user scans in the IMEI of a device on a chosen slot. The main application then handles the actual erasure process. The system will determine whether the connected device is an iOS device or an Android device, and starts the respective erasure process for that device accordingly. All of the relevant information from the device and/or the erasure process may be continuously passed to the GUI during the erasure process, so that the user can monitor the data erasure process in real-time.

In one embodiment, the GUI is a flexible application that is compatible with multiple configurations: e.g. 10-slot and 30-slot. The GUI displays all necessary information to the user, such as the current step in the erasure process for a specific device, and/or details about the device plugged into its respective slot. Once the erasure process is finished, the GUI will display whether or not the erasure process was successful. If not successful, the GUI will show a reason explaining why it was unsuccessful. The user may then unload the device from its respective slot and print a label for the device.

Figure 2A:
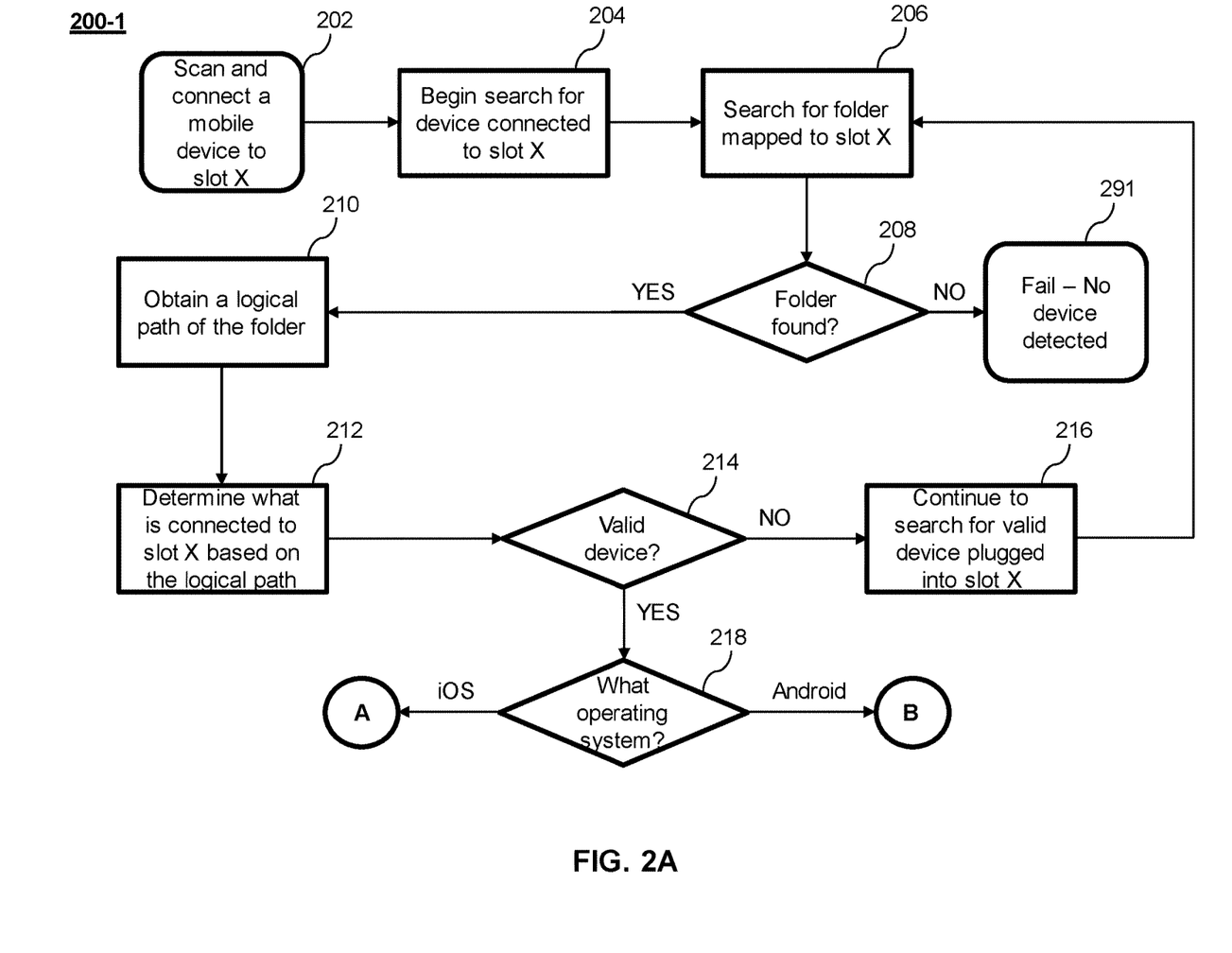
FIGS. 2A-2C show a flow chart illustrating an exemplary method for automatically removing customer data of mobile devices, in accordance with some embodiments of the present disclosure.
Figure 2B:
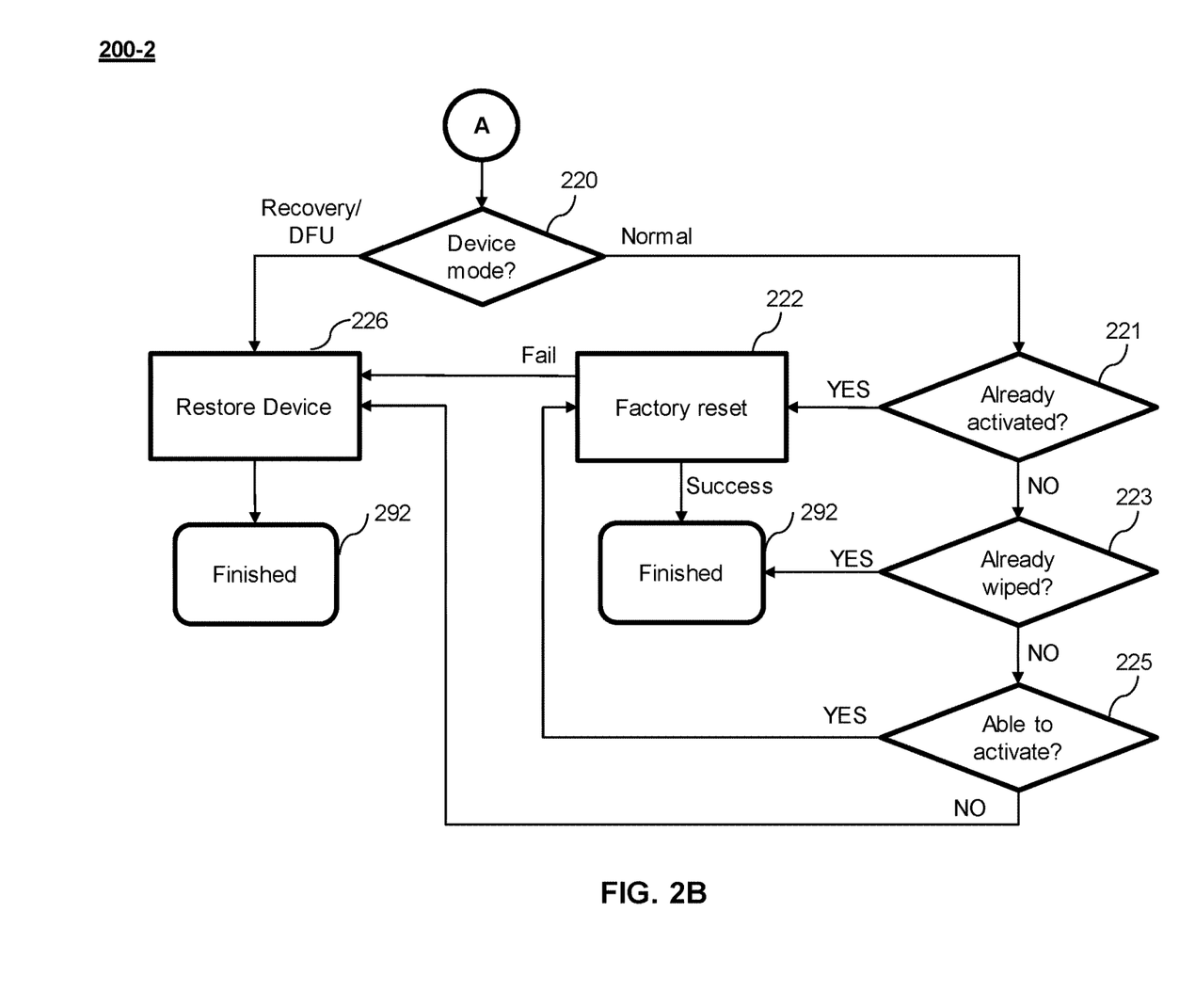
Figure 2C:
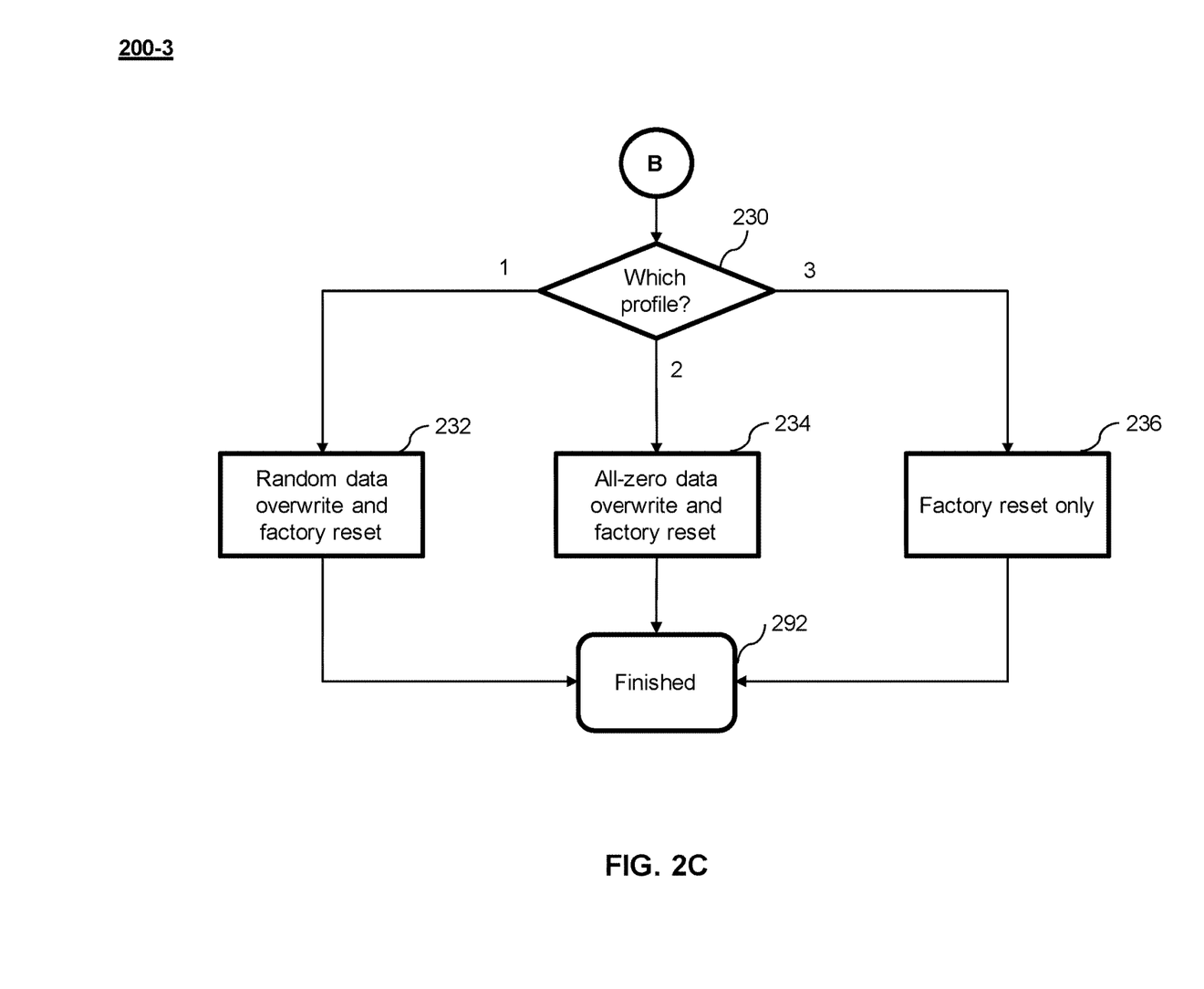

Through all the features and subsystem described above, a data removal procedure can be made completely automatic and parametric. FIGS. 2A-2C show a flow chart illustrating an exemplary method for automatically removing customer data of mobile devices using a system disclosed above, in accordance with some embodiments of the present disclosure.

As shown in FIG. 2A, the method 200-1 starts from operation 202, where a user scans and connects a mobile device to an open slot, e.g. slot X, of the system. In one embodiment, each mobile device to be handled by the system has a label on the back of the mobile device with a barcode containing the mobile device's serial number, e.g. an IMEI. The user may use a barcode scanner to scan the IMEI attached to the mobile device, wherein the scanned IMEI is input into the system and associated with the respective slot.

At operation 204, the system begins searching for a device connected to the slot X. The system searches, at operation 206, for a USB folder mapped to the slot X, e.g. by checking data in a file system. This checking may be repeated for a pre-determined period of time (e.g. 10 minutes) or until a USB folder is found. At operation 208, it is determined whether the USB folder is found. If not, the process goes to operation 291, where the data removal process fails as no device is detected.

If a USB folder mapped to the slot X is determined to be found at operation 208, the mobile device connected to the slot X is detected by the system. The process thus goes to operation 210, where a logical path of the USB folder is obtained, e.g. by examining the busnum and/or devnum properties of the mobile device. At operation 212, the system then determines what is connected to slot X based on the logical path and a property display command, e.g. a lsusb command. At operation 214, it is determined whether the mobile device is a valid device. If so, the process goes to operation 218 to determine an operating system running on and managing the mobile device. If not, the process goes to operation 216 to continue to search for valid device plugged into the slot X, and the process goes back to operation 206.

In one embodiment, a valid device is a device whose operating system can be recognized by the system. For example, valid iOS devices may include iPhones, iPads, and iPods, which can be determined by checking the product type; and valid Android devices can be determined by checking Vendor ID and Product ID. After the system recognizes the mobile device that is connected to that specific slot, the system begins reading initial device information, such that the system can determine whether the connected device is an iOS device or an Android device at operation 218.

Depending on the operating system of the device, the system will start either an iOS erasure process or an Android® erasure process. In one embodiment, the iOS erasure process requires no interaction with the device; while the Android® erasure process requires that the user enables USB debugging mode on the respective Android device.

In FIG. 2A, if it is determined at operation 218 that the operating system of the mobile device is iOS, the process goes to branch A directed to method 200-2 in FIG. 2B; and if it is determined at operation 218 that the operating system of the mobile device is Android®, the process goes to branch B directed to method 200-3 in FIG. 2C.

In one embodiment, at the beginning of an iOS data removal process, the system attempts to collect relevant device information. This information may include e.g. Activation Lock status, subscriber identification module (SIM) card status, as well as general device information. If a SIM card is found, the user is notified on the GUI to remove the SIM card before proceeding with the erasure process. After the relevant information is obtained, the erasure will start via either a factory reset or a data restore (firmware flashing). The system will determine which erasure method to perform. A factory reset is not applicable to some devices in certain states. If the device information cannot be pulled before the erasure due to the device not being paired, then the device is first erased and then the information is obtained afterwards.

As shown in FIG. 2B, an iOS data removal process 200-2 starts at operation 220, where the system determines whether the device mode of the mobile device is a normal mode or a recovery/DFU (device firmware update) mode. If it is determined at operation 220 that the device mode of the mobile device is a recovery/DFU mode, the process goes to operation 226 to restore the device, i.e. flashing the firmware of the mobile device. Whether the firmware flashing is successful or not at operation 226, the process is finished at operation 292.

If it is determined at operation 220 that the device mode of the mobile device is a normal mode, the process goes to operation 221 to determine whether the mobile device is activated. If the mobile device is activated, the process goes to operation 222 to perform a factory reset on the mobile device. If the factory reset is successfully performed, the process is finished at operation 292. If the factory reset fails at operation 222, the process goes to operation 226 to restore the device, i.e. flashing the firmware of the mobile device.

On the other hand, if the mobile device is not activated at operation 221, the process goes to operation 223 to determine whether the mobile device has already been wiped. If so, the process is finished at operation 292. If not, the process goes to operation 225 to determine whether the mobile device is able to be activated. In one embodiment, to determine if a mobile device is already wiped, the system may check PurpleBuddy key/value pairs to see if the device has completed initial setup process.

At operation 225, if the mobile device is able to be activated, the process goes to operation 222 to perform a factory reset on the mobile device. If the mobile device is not able to be activated, the process goes to operation 226 to restore the device, i.e. flashing the firmware of the mobile device.

According to one embodiment, in an Android® data removal process, once the device is in USB debugging mode, the system can install a data removal application onto the mobile device and launch it. The application first grabs relevant device information. This information includes e.g. SIM card and memory card status. If a SIM/memory card is found in the device, the user will be prompted to remove it before the erasure process continues. The application will then ask for administrator privileges to be able to factory reset the device. Once the administrator privileges are allowed, the erasure process will start. The erasure process comprises: removing temporary data, clearing data from installed packages, removing external data, overwriting all available space, and/or triggering a factory reset.

As shown in FIG. 2C, an Android® data removal process 200-3 starts at operation 230, where the system determines a profile type of the mobile device, to perform a factory reset on the mobile device based on the profile type. In one embodiment, a profile type is determined based on how secure the data erasure is desired to be. Different profiles can have different levels of security. Based on the application and where the mobile device comes from, the system can determine a profile corresponding to how secure the data erasure needs to be. In one embodiment, all of the mobile devices on the test rack will use a same profile. The system may utilize a chosen or determined profile until a different profile is chosen based on a different desired security level of data removal.

If it is determined at operation 230 that the profile type of the mobile device is a first profile type, the process goes to operation 232 to overwrite the mobile device with random data and perform a factory reset on the mobile device. If it is determined at operation 230 that the profile type of the mobile device is a second profile type, the process goes to operation 234 to overwrite the mobile device with all-zero data and perform a factory reset on the mobile device. If it is determined at operation 230 that the profile type of the mobile device is a third profile type, the process goes to operation 236 to perform a factory reset on the mobile device without overwriting the mobile device. In all three cases, the process is finished and completed at operation 292.

During the entire data erasure process, if the system finds a serial number mismatch of the mobile device, the system will stop the process and generate a warning to the user via the GUI. A serial number mismatch, e.g. an IMEI mismatch, may be determined by comparing an IMEI that was scanned into the system via the scanner with a built-in IMEI on the mobile device.

Each mobile device has a unique IMEI built therein, e.g. at its motherboard. The application can retrieve this unique built-in IMEI from the mobile device when communicating to the mobile device via the connector, e.g. a USB. In one embodiment, for iOS devices, the system utilizes a service on the mobile device to fetch device information, such as IMEI, serial number, etc. In one embodiment, for Android devices, the system has an application installed onto the mobile device to query the device information from the device.

In addition, a label on the mobile device (e.g. on the back of the device) has the IMEI in a barcode that can be scanned in with a scanner. There is a chance that a wrong label is put on the mobile device or a wrong IMEI is put on the label, e.g. due to operator error. Therefore, an IMEI check can verify whether the scanned-in IMEI matches with the built-in IMEI of the mobile device. In one embodiment, an IMEI mismatch warning or an operation error shows up when the scanned-in IMEI does not match the built-in IMEI retrieved from the mobile device.

In one embodiment, once a data erasure process is completed, the GUI will update with a final status: PASS or FAIL. A PASS status means that the mobile device goes back to its initial manufacturing setup with no customer personal information on the mobile device. That is, after a successful data removal process, the mobile device may display a start screen or a "Hello" screen like when a user turns on a brand new mobile device for the first time. If the erasure process fails for any reason, the GUI will display a short reason as to why the process failed.

The user then has the option to unload the device from its respective slot by selecting the "Unload" button corresponding to the slot. If needed, a label can be printed for the device that is being unloaded, which includes the result of the erasure on the label. The slot on the GUI will be freed up, allowing another device to be processed on that slot. In one embodiment, a mobile device failed the data removal process may be sent to a technician for repair or fixing related issues, such that it can go through the process later for data removal.

Figure 3:
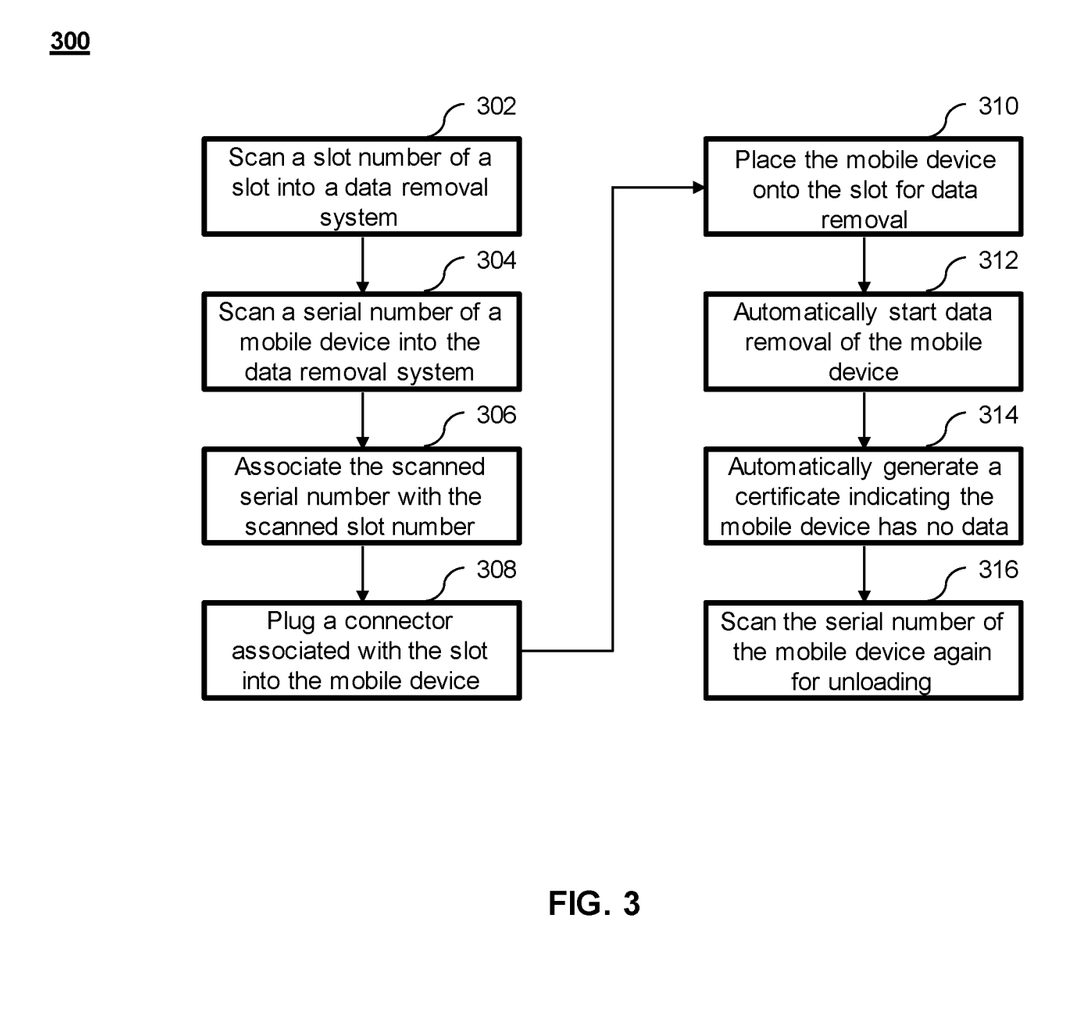
FIG. 3 is a flow chart showing an exemplary method for automatically removing customer data of a mobile device, in accordance with some embodiments of the present disclosure.

FIG. 3 is a flow chart showing an exemplary method for automatically removing customer data of a mobile device, in accordance with some embodiments of the present disclosure. At operation 302, a slot number of a slot is scanned into a data removal system. At operation 304, a serial number of a mobile device is scanned into the data removal system. At operation 306, the scanned serial number is associated with the scanned slot number. At operation 308, a connector associated with the slot is plugged into the mobile device.

In one embodiment, the slot is a first slot on a rack including a plurality of slots. The scanning may be performed by a scanner of the data removal system. The scanner may scan a barcode or a serial number wirelessly, by light or laser. The scanner may be connected to a computer that controls data removal of the mobile device.

At operation 310, the mobile device is placed onto the slot for data removal. At operation 312, the data removal of the mobile device is automatically started, e.g. by a data removal application on the computer connected to the mobile device via the connector. At operation 314, a certificate indicating the mobile device has no data is automatically generated after the data removal. In one embodiment, the certificate may be sent by the computer to a database e.g. via Wi-Fi, with a corresponding serial number and a corresponding slot number, to certify that the mobile device has no customer data. At operation 316, the serial number of the mobile device is scanned again after the data removal and before the mobile device is unloaded from the slot, to verify a correct mobile device is unloaded. The order of the operations shown in FIG. 3 may be changed according to different embodiments of the disclosure.

In one embodiment, after a first mobile device is placed on a first slot on the rack for data removal, and during the customer data removal of the first mobile device, a second mobile device may be placed on a second slot on the rack for data removal, following a similar process shown in FIG. 3. In addition, during the customer data removal of the second mobile device, a third mobile device may be placed on a third slot on the rack for data removal, following a similar process shown in FIG. 3. The customer data removal processes of any two of the first, second and third mobile devices may be performed by a same computer or different computers.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, Phablet, PDA, smartphone, or wearable technology The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device, smartphone or tablet. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a mobile smartphone, a personal digital assistant (PDA), tablet, a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Although examples are illustrated and described herein, embodiments are nevertheless not limited to the details shown, since various modifications and structural changes may be made therein by those of ordinary skill within the scope and range of equivalents of the claims.

What is claimed is:

1. An apparatus for automatic data removal, comprising:
a rack comprising a plurality of slots each of which is configured for holding a mobile device;
a plurality of connectors each of which is associated with a respective one of the plurality of slots;
at least one computer coupled to the rack, wherein each of the at least one computer corresponds to a subset of the plurality of connectors, and has a processor and a non-transitory computer readable storage medium storing software for automatically determining an operating system managing the mobile device, and proceeding with either one of two erasure processes depending on the operating system of the mobile device to automatically remove customer data of each mobile device connected to the computer via a corresponding one of the subset of the plurality of connectors; and
a user monitor electrically connected to the at least one computer and configured for displaying information related to data removal performed by the at least one computer, wherein after removing customer data of each mobile device, a visual indication is shown on a screen of the mobile device to indicate a finish of removal of the customer data of the mobile device.

2. The apparatus of claim 1, further comprising a scanner electrically connected to the at least one computer and configured for, for each of the plurality of slots,
scanning a serial number of a corresponding mobile device to be held on the slot; and
associating the scanned serial number with a slot number before removing customer data of the corresponding mobile device.

3. The apparatus of claim 1, further comprising:
a plurality of cable hubs each of which is configured for connecting a subset of the plurality of connectors to one of the at least one computer.

4. A method for automatic data removal, comprising:
scanning, using a scanner, a first serial number attached on a first mobile device;
associating the first serial number with a first slot number of a first slot on a rack including a plurality of slots;
plugging a first connector associated with the first slot into the first mobile device;
loading the first mobile device onto the first slot;
automatically determining an operating system managing the first mobile device, and proceed with either one of two erasure processes depending on the operating system of the first mobile device; and
automatically performing a removal of customer data of the first mobile device via the first connector and a first computer associated with the first slot, wherein after performing the removal of the customer data of the first mobile device, a visual indication is shown on a screen of the first mobile device to indicate a finish of the removal of the customer data of the first mobile device.

5. The method of claim 4, further comprising:
automatically generating a certificate indicating that the first mobile device has no customer data after the removal;
scanning, using the scanner, the first serial number of the first mobile device again after the removal; and
unloading the first mobile device from the first slot.

6. The method of claim 4, further comprising, while automatically performing the removal, the following:
scanning, using the scanner, a second slot number of a second slot on the rack;
scanning, using the scanner, a second serial number attached on a second mobile device;
associating the second serial number with the second slot number;
plugging a second connector associated with the second slot into the second mobile device;
loading the second mobile device onto the second slot; and
automatically performing a removal of customer data of the second mobile device via the second connector and the first computer associated with the second slot as well.

7. The method of claim 4, further comprising, while automatically performing the removal, the following:
scanning, using the scanner, a third slot number of a third slot on the rack;
scanning, using the scanner, a third serial number attached on a third mobile device;
associating the third serial number with the third slot number;
plugging a third connector associated with the third slot into the third mobile device;
loading the third mobile device onto the third slot; and
automatically performing a removal of customer data of the third mobile device via the third connector and a second computer associated with the third slot.

8. The method of claim 4, further comprising:
automatically determining a built-in serial number of the first mobile device via the first connector;
automatically comparing the built-in serial number with the first serial number to determine whether there is a serial number mismatch; and
upon determining that there is a serial number mismatch, automatically reporting an error associated with the first slot.

9. The method of claim 4, wherein automatically performing the removal of the customer data comprises performing an update of software of the first mobile device.

10. A method for automatically removing customer data of a mobile device, comprising:
detecting a mobile device connected to a slot;
automatically determining whether the mobile device is valid based on data in a file system;
upon determining that the mobile device is valid, automatically determining an operating system managing the mobile device, and proceed with either one of two erasure processes depending on the operating system of the mobile device;
if the operating system is a first operating system:
determining a device mode of the mobile device based on the first operating system;
if the mobile device is in a recovery mode, flashing a firmware of the mobile device; and
if the mobile device is in a normal mode, determining whether the mobile device is activated or not, and if the mobile device is activated, perform a factory reset of the mobile device;
if the operating system is a second operating system, initiating a USB debugging mode and installing a data removal application on the mobile device based on the second operating system;
automatically removing customer data of the mobile device based on the operating system; and
after removing the customer data of the mobile device, displaying a visual indication on a screen of the mobile device that the customer data has been removed.

11. The method of claim 10, wherein automatically determining whether the mobile device is valid comprises:
searching in the file system for a folder mapped to the slot;
obtaining a logical path of the folder; and
determining whether the mobile device is valid based on the logical path and a property display command.

12. The method of claim 10, wherein automatically removing customer data of the mobile device further comprises:
upon determining that the mobile device is activated, performing a factory reset on the mobile device; and
flashing the firmware of the mobile device when the factory reset fails.

13. The method of claim 10, wherein automatically removing customer data of the mobile device further comprises:
upon determining that the mobile device is not activated, determining whether the mobile device has been wiped and whether the mobile device is able to be activated.

14. The method of claim 13, wherein automatically removing customer data of the mobile device further comprises:
upon determining that the mobile device has not been wiped and that the mobile device is able to be activated, performing a factory reset on the mobile device.

15. The method of claim 13, wherein automatically removing customer data of the mobile device further comprises:
upon determining that the mobile device has not been wiped and that the mobile device is not able to be activated, flashing the firmware of the mobile device.

16. The method of claim 13, wherein
the mobile device is running an iOS operating system, and
determining whether the mobile device has been wiped includes checking PurpleBuddy key/value pairs on the mobile device to see if the mobile device has completed an initial setup process.

17. The method of claim 10, wherein automatically removing customer data of the mobile device further comprises:
if the operating system managing the mobile device is the second operating system:
determining a profile type of the mobile device; and
performing a factory reset on the mobile device based on the profile type.

18. The method of claim 17, wherein automatically removing customer data of the mobile device further comprises:
upon determining that the profile type of the mobile device is a first profile type, overwriting the mobile device with random data and performing a factory reset on the mobile device;
upon determining that the profile type of the mobile device is a second profile type, overwriting the mobile device with all-zero data and performing a factory reset on the mobile device; and
upon determining that the profile type of the mobile device is a third profile type, performing a factory reset on the mobile device without overwriting the mobile device.

19. The method of claim 10, wherein if the automatically removing customer data of the mobile device fails for any reason, a graphical user interface will display a reason why the process failed.

20. The method of claim 10, wherein the first operating system is iOS and the second operating system is Android®.

* * * * *